Figure 1:
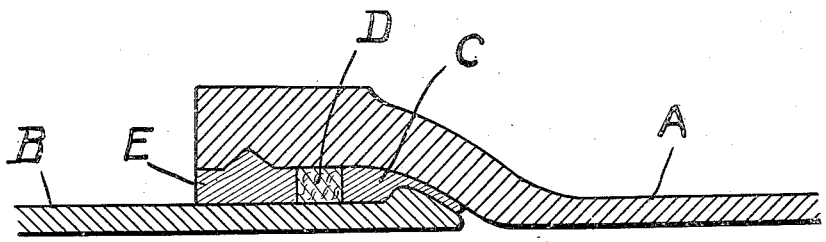

May 3, 1932.  D. B. STOKES  1,856,890

PIPE JOINT PACKING

Filed Nov. 28, 1930

INVENTOR
David B. Stokes
BY
ATTORNEY.

WITNESS:

Patented May 3, 1932

1,856,890

UNITED STATES PATENT OFFICE

DAVID B. STOKES, OF BEVERLY, NEW JERSEY, ASSIGNOR TO UNITED STATES PIPE & FOUNDRY COMPANY, OF BURLINGTON, NEW JERSEY, A CORPORATION OF NEW JERSEY

PIPE JOINT PACKING

Application filed November 28, 1930. Serial No. 498,586.

My invention relates to pipe joint packings and has for its object to provide a packing ring and a method of using the same which will obviate, as far as possible, the tendency of pipe joint packing rings to become leaky after they have been in use for a considerable period. In the formation of pipe joint packings between overlapping bell and spigot ends of coupled pipes, packing rings and sometimes a multiple number of packing rings, are forced between the interengaged pipe ends, sometimes by tamping hemp or other similar fibre into a compact ring, sometimes by tamping lead into the form of a ring, sometimes by the use of rubber or the like as a packing ring, and sometimes by forming a packing ring out of cement. All such joints are liable to become leaky, partly by reason of the expansion and contraction of the pipes, sometimes by the degeneration of material used to form packing rings and sometimes by reason of the shrinkage of the packing rings due to the gradual elimination of moisture therefrom. The object of my invention is to provide a packing ring which can be used to form a tight joint by tamping it in place, which will be free from the tendency to shrink and which will accommodate itself to such motions of the coupled pipes as are brought about by expansion and contraction thereof and my invention consists in a packing ring made up of some absorbent material, such for instance as hemp or other fibre, thoroughly impregnated and saturated with a cementing material compound of some substance substantially inert to chemicals contained in the fluid passing through the pipes and of such a character that it becomes more or less liquefied by heating, said substance being compounded with glycerine or similar hydroscopic liquid so as to form a homogeneous cement. In operation the fibrous material having the general form of the packing ring is thoroughly impregnated and saturated with the cement, then inserted in the pipe joint and tamped or pressed into place and then means are provided for holding the packing ring in position, as, for instance, by means of additional rings of cement or lead. For the best results the ring before application to the joint should be heated to a sufficient extent to at least partly liquefy and soften the cement component, then forced into place in the joint so as to completely fill the annular space in which it is located and then permitted to congeal.

For the best results I have used a cement compounded of glue and glycerine and prepared by melting the glue, to which has been added sufficient water to soften it, over a steam bath, thoroughly mixing with the melted glue the glycerine and then saturating the fibrous material of the ring with the warm and liquid cement. My best results have, I think, been obtained by using glycerine to the extent of ten percent of the glue employed, though very good cements for my purpose can be made with a wide variety in the glycerine component; thus I have successfully used glycerine to the extent of 5 to 18 per cent of the glue. This particular cement has the advantage of forming on congealing, a mass which is not only impervious but elastic but very excellent results can be had by forming a cement of mixtures of glycerine with other plastic materials, such, for instance, as soaps. Where glue or other material subject to putrefaction is employed, it is of course advisable to add some disinfectant which will prevent putrefaction and for this purpose I have found the use of a tenth of one percent of phenol to be sufficient and effective.

My invention will perhaps be better understood as explained in connection with the drawings forming a part of this specification, in which Figure 1 is a longitudinal section through a pipe joint embodying my invention, and Figures 2 and 3 perspective views illustrating the make-up of two modifications of my packing ring.

A, Fig. 1, indicates the bell end and B the spigot end of two coupled pipes. C indicates a packing of lead, which is tamped into the base of the joint; D my improved packing ring which should be of permeable material, such as jute or other fibre, impregnated with a cement such as I have described, and E a further packing of lead tamped into the outer portion of the joint.

In operation the lead packing C having been tamped into place, my packing ring D is inserted, tamped or pressed into place so as to form a tight closure and then, in the construction illustrated in Fig. 1, the lead packing E is tamped in so as to hold the compressed packing ring D securely in place.

Figure 2:
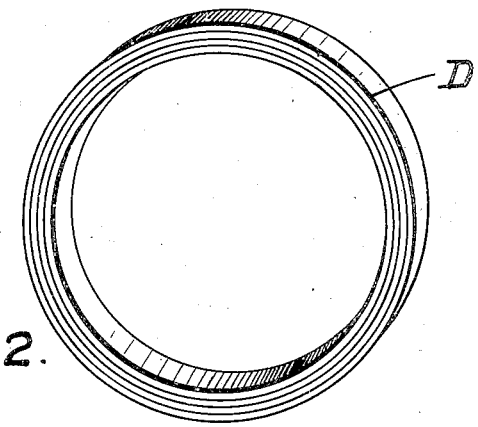
Figure 3:
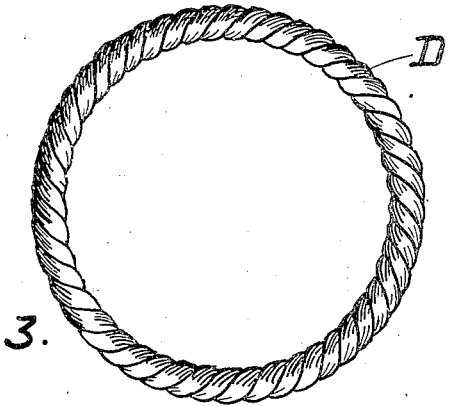

In Fig. 2 I have indicated the packing ring D as made up of layers of cloth superimposed upon each other and thoroughly saturated and covered with the cementing material, and in Fig. 3 I have illustrated a modification in the make-up of the packing ring, which is here made up of a roughly twisted rope of fibrous material, such as hemp, wound into the general form of a ring and thoroughly saturated with the cementing material.

Having now described my invention, what I claim as new and desire to secure by Letters Patent, is:

1. A packing ring for pipe joints made up of an absorbent packing material saturated with a plastic compound of glycerine and a substance substantially nonreactive with chemicals contained in the fluids passing through the pipe, said plastic compound having the characteristics of congealing at normal temperatures and liquefying when heated.

2. A packing ring having the characteristic features of claim 1, in which the plastic compound consists of a mixture of glue and glycerine.

DAVID B. STOKES.